(12) United States Patent
Mitchell et al.

(10) Patent No.: US 7,280,218 B2
(45) Date of Patent: Oct. 9, 2007

(54) APPARATUS AND METHOD TO FACILITATE LASER GYROSCOPE IONIZATION

(75) Inventors: Robert A. Mitchell, Woodland Hills, CA (US); Christine E. Geosling, Calabasas, CA (US); Ralph A. Patterson, Moorpark, CA (US)

(73) Assignee: Litton Systems Inc., Woodland Hills, CA (US)

( * ) Notice: Subject to any disclaimer, the term of this patent is extended or adjusted under 35 U.S.C. 154(b) by 277 days.

(21) Appl. No.: 11/030,248

(22) Filed: Jan. 6, 2005

(65) Prior Publication Data

US 2006/0146335 A1 Jul. 6, 2006

(51) Int. Cl.
*G01C 19/66* (2006.01)
(52) U.S. Cl. .......................................... 356/459; 372/94
(58) Field of Classification Search ................ 356/459; 372/94
See application file for complete search history.

(56) References Cited

U.S. PATENT DOCUMENTS

| | | | |
|---|---|---|---|
| 3,738,242 A * | 6/1973 | Lee et al. ................. | 396/548 |
| 4,317,089 A | 2/1982 | Grant, Jr. et al. | |
| 4,392,229 A * | 7/1983 | Hostetler ................. | 356/459 |
| 4,481,635 A * | 11/1984 | Broberg et al. ........... | 356/459 |
| 5,116,132 A | 5/1992 | Mitchell et al. | |
| 5,196,905 A | 3/1993 | Hahn et al. | |
| 5,313,488 A * | 5/1994 | Podgorski ................. | 372/94 |
| 5,432,604 A | 7/1995 | Canfield et al. | |
| 5,488,622 A | 1/1996 | Mitchell | |
| 5,786,895 A | 7/1998 | Mitchell et al. | |

OTHER PUBLICATIONS

Colonel William D. Siuru, Jr. USAF (RET) & Major Gerald L. Shaw; *Laser Gyroscopes-The Revolution in Guidance and Control*; Science and Technology Perspectives; http://www.airpower.Maxwell.af.mil/airchronicles/aureview/1985/may-jun/siuru.html; pp. 1-6.

* cited by examiner

*Primary Examiner*—Samuel A. Turner
(74) *Attorney, Agent, or Firm*—Tarolli, Sundheim, Covell & Tummino LLP

(57) ABSTRACT

An apparatus and method is provided for facilitating ionization of a gas medium of a laser gyroscope. The apparatus and method employ a solid state light emitting device as a start aid for the laser gyroscope. The solid state light emitting device has a wavelength at or below a threshold wavelength based on a work function of a cathode coating material to prompt ionization of a gas medium within the laser gyroscope.

20 Claims, 4 Drawing Sheets

APPARATUS AND METHOD TO FACILITATE LASER GYROSCOPE IONIZATION

TECHNICAL FIELD

The present invention relates to laser gyroscopes and, more particularly, to an apparatus and method to facilitate laser gyroscope ionization.

BACKGROUND OF THE INVENTION

There is an increasing demand for accurate, yet low-cost and highly reliable guidance, control and navigation systems for air, land, sea and space vehicles. Many of these navigation systems employ gyroscope devices, which can precisely measure changes in orientation (e.g., pitch, roll, yaw) of the vehicles as the vehicles move. In many applications, the well known mechanical gyroscope with its rotating wheels has been replaced by the laser gyroscope. Once such type of laser gyroscope is known as a ring laser gyroscope. A ring laser gyroscope employs the Sagnac effect to measure rotation. That is that two counterpropagating light beams in a closed path will have transit times that differ in direct proportion to the rotation rate about an axis perpendicular to the plane of the path. In a ring laser gyroscope the closed path is defined by mirrors that direct the light beams around the path. The mirrors are precisely aligned to direct the light beams around the closed path. The mirror surfaces need to be free of defects to provide a laser beam intensity that will result in a usable signal.

As a result, the closed path is typically in a cavity formed in a frame or body that is formed of a glass ceramic material. The preferred glass ceramic material has a near zero coefficient of thermal expansion over the operating temperature range of a ring laser gyroscope. The glass ceramic preferred for ring laser applications is formed of a lithium aluminosilicate (LAS) material. The cavity is evacuated and then filled with a mixture of helium and neon, which is the gain medium for the laser. To excite the ring laser to cause two laser paths in opposite directions, it is customary to attach at least one cathode somewhere to the laser frame and to provide anodes on the laser frame together with conduits connecting the anodes and the cathodes into the laser bores in a geometric configuration, whereby a motion of ions and electrons between the cathode and anodes excites the laser phenomenon.

Application of a voltage of sufficient magnitude to ionize the gas between the cathode and anodes is applied to the cathode and to the anodes to cause a migration of electrons from the cathode to the anode and a migration of positive ions from the anodes to the cathode within the gain bores of the lasing gas, thereby exciting the lasing gas and producing counterpropagating light beams. The light beams are directed along the closed path by the precisely aligned mirrors, and captured by a detector outside the closed path. A rotation rate can be determined based on a comparison of the frequencies of the two counterpropagating light beams.

SUMMARY OF THE INVENTION

In accordance with one aspect of the present invention, a ring laser gyroscope is provided. The ring laser gyroscope comprises a frame having a cavity that forms a path defined by a plurality of mirrors, a gain medium positioned in the cavity that produces counterpropagating light beams when electrically excited, and a cathode and two anodes connected to the cavity and forming two gain regions of the cavity for plasma discharge in opposing directions of the gain regions. The ring laser gyroscope also comprises a solid state light emitting device that illuminates the cathode during at least a startup period of the laser gyroscope to facilitate ionization of the gas medium. The solid state light emitting device can generate light at a wavelength that is at or below a threshold wavelength based on a work function of the coating material of the cathode.

In accordance with another aspect of the present invention, a method is provided for facilitating ionization of a gas medium positioned in a cavity of a frame of a ring laser gyroscope having a cathode and two anodes connected to the cavity and forming two gain regions of the cavity for plasma discharge in opposing directions of the gain regions. The method comprises illuminating the cathode with a solid state light source that generates light at a wavelength that is at or below a threshold wavelength based on a work function of the coating material of the cathode, applying a start voltage across the anodes and cathode, determining if the gas medium has begun to ionize, and reducing the start voltage to an operating voltage once the gas ionizes.

In yet a further aspect of the present invention, a method provides for providing a start aid for a ring laser gyroscope. The method comprises determining a start aid threshold wavelength based on a work function of a coating material of a cathode of the ring laser gyroscope, determining a cutoff wavelength associated with a frame material and frame material thickness of the ring laser gyroscope, and selecting a light emitting diode (LED) that has a wavelength between the start aid threshold wavelength and the cutoff wavelength as a start aid.

DETAILED DESCRIPTION OF INVENTION

The present invention relates to an apparatus and method for facilitating ionization of a gas medium of a laser gyroscope. The apparatus and method employ a solid state light emitting device as a start aid for the laser gyroscope. The solid state light emitting device provides for a low current light source that produces a substantially consistent wavelength with enough intensity to provide as a start aid for a laser gyroscope. A light source having a wavelength at a threshold wavelength based on a work function of the cathode coating material of a cathode can produce enough energy to eject electrons from the cathode surface to create the desired photoelectric effect, and facilitate the prompt ionization of a gas medium within the laser gyroscope.

In one aspect of the invention, the start aid is a light emitting diode (LED) (e.g., a blue LED) having a wavelength that is in the deep blue to violet part of the visible spectrum (e.g., about 390 nm to about 490 nm). An LED can be selected that provides light at a wavelength that is at or below a threshold wavelength, based on a work function of the cathode coating material, that produces the required energy to create the desired photoelectric effect. The LED can also be selected that provides light at a wavelength that is above the cutoff wavelength of the material of the frame of the laser gyroscope, since the LED is to be positioned outside of the cavity of the frame.

For example, other start aids can include providing a large voltage spike across the anodes and cathodes during startup to initiate ionization, which can require a high start up voltage and a high operating voltage. Other light sources employed as start aids, such as incandescent lamps require large currents to operate, and produce a continuous blackbody spectrum, which peaks in the infrared, with most of its radiation outside the threshold window of the work function of the cathode material causing inefficiencies. Additionally, the radiation emitted by these types of light sources can vary over time and temperature to such an extent that failures in starting of the laser gyroscope can result.

Figure 1:
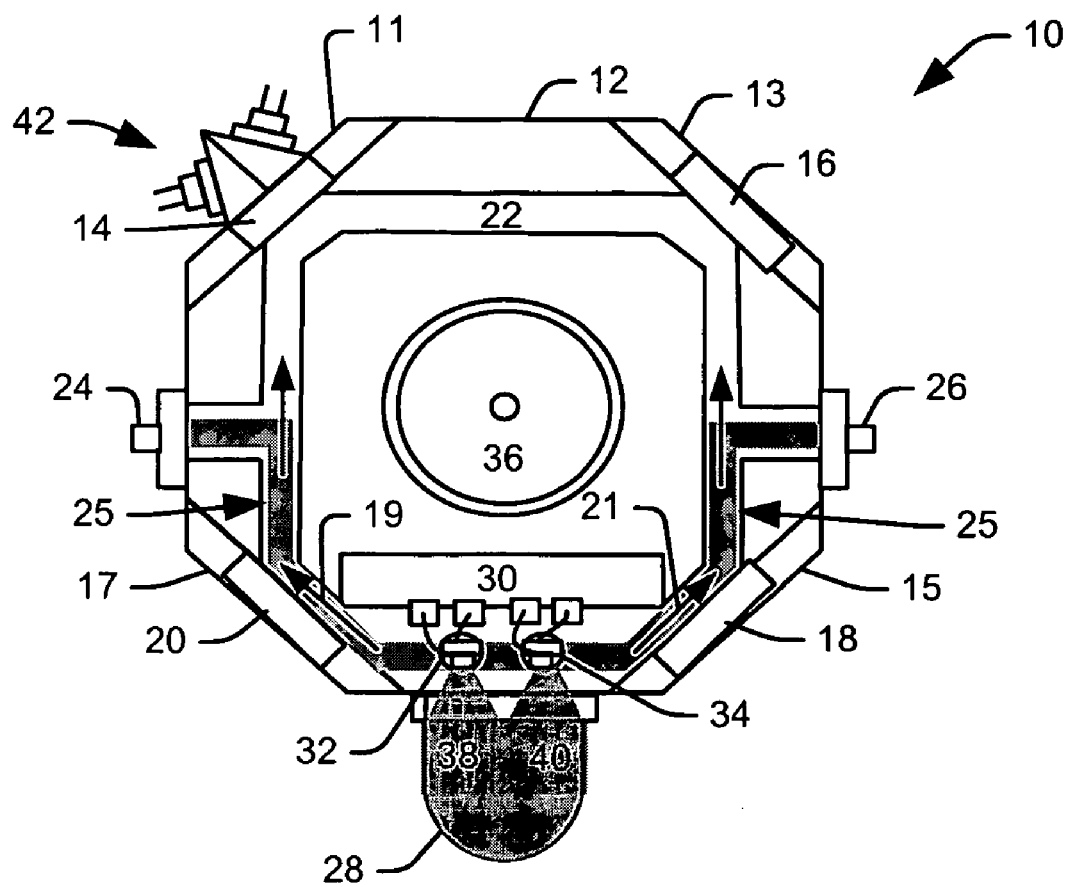
FIG. 1 illustrates a top view of a ring laser gyroscope in accordance with an aspect of the present invention.

FIG. 1 illustrates a ring laser gyroscope 10 that includes a frame 12 that has a generally rectangular shape with four angle sides on the corners to form four mounting faces 11, 13, 15 and 17. The frame 12 also includes a supporting center post 36 for mounting to a vehicle in which rotation rate measurements are being performed. The frame 12 is typically formed from a glass ceramic material that has a near zero coefficient of thermal expansion over the operating temperature range of the ring laser gyroscope 10. The glass ceramic material can be a lithium alumino-silicate (LAS) material. Typical acceptable glass ceramic materials employed in laser gyroscopes are known by the trademark CERVIT, ZERODUR AND ULE. A plurality of mirrors 14, 16, 18 and 20 are mounted on the mounting faces 11, 13, 15 and 17, respectively. A cavity 22 is formed in the frame 12 to form a rectangular path around the frame 12 between the mirrors 14, 16, 18 and 20. It is to be appreciated that the frame can be formed from other structural type configurations, such as a triangular configuration with three mirrors, or it may have more than four mirrors and four mounting surfaces. A gain medium is positioned in the cavity 22. The gain medium is typically a mixture of helium and neon, which, when electrically excited, produces counterpropagating light beams 19 and 21 in the cavity 22.

Energy is delivered to the gain medium by a power supply (not shown) which applies suitable voltages to a pair of anodes 24 and 26 and to a cathode 28. A plasma discharge is confined to a region 25 within the cavity between the cathode 28 and the pair of anodes 24 and 26. At initialization, a start aid is turned on for at least a startup time period (e.g., two seconds), while a high voltage is initially applied between anodes 24 and 26 and the cathode 28. The startup time period can be based on a predetermined time period, or by the detection of counterpropagating beams that are a result of ionization of the gas medium. For example, a start voltage can be about 1000 volts to about 3000 volts (e.g., about 2500 Volts) that is applied at each of the pair of anodes 24 and 26 with a ground being applied to the cathode 28.

The start aid is comprised of at least one solid state device that emits light rays at the cathode 28. The emitted light rays have a photon wavelength that initiates the release of electrons from the cathode 28, wherein the electrons propagate to the respective anodes 24 and 26. The photon wavelength of the emitted light rays are selected to provide the required minimal energy, which could only be transferred by a photon of energy equal or greater than the minimal threshold energy to begin the release of an electron from the cathode 28 to the anodes 24 and 26. The shorter the wavelength of a given photon, the higher the energy provided by the wavelength. The wavelength of the solid state light source is also selected to be above the cutoff wavelength of the frame material.

After the gas medium ionizes, the solid state light source can be turned off, but may remain on during normal operation. Additionally, the voltage between the anodes 24 and 26 and cathode 28 drops to an operation voltage of about 600 volts to about 800 volts (e.g., about 700 Volts). The start voltage is applied through a very high value of resistance. However, once the gas ionizes, it provides a much lower resistance than the start voltage current limiting resistance. Therefore, the operating voltage is reduced from the initial starting voltage.

In one aspect of the invention, the solid state light emitting device can be a light emitting diode (LED). The LED can provide a wavelength that is above the cutoff wavelength of the frame material, but at or below a threshold wavelength based on the work function of the cathode material to produce the desired photoelectric effect. For example, the necessary threshold wavelength to produce the threshold energy associated with a given work function of the cathode material can be determined by the following equation:

$$\text{wavelength (nm)} = (1/(WF_{CATH} ev * 8063 \text{ cm}^{-1}/ev) * 1*10^7 \text{ nm/cm} \qquad \text{EQ. 1}$$

where $WF_{CATH}$ is the work function of the cathode material. For example, the work function of a cathode coated with pure aluminum is about 4.3 electron-volts (ev). This value can be reduced by a subsequent oxidation process resulting in a 2.8 ev work function for the oxidized aluminum. For Eq. 1, this translates to a 443 nm photon wavelength as the threshold wavelength to produce the desired photoelectric effect. Therefore, an LED that produces a wavelength at or below 443 nm (e.g., a 430 blue nm LED) can generate the energy required to produce the desired photoelectric effect and initiate ionization of the gas medium. Additionally, the wavelength needs to be above the cutoff wavelength of the frame material. For example, the frame material can be comprised of ZERODUR glass which a strong cutoff wavelength of 380 nm or shorter. Therefore, a LED light source start aid can be selected that produces light at a wavelength between about 380 nm and about 443 nm for a ZERODUR glass frame material and oxidized aluminum cathode material.

Figure 3:
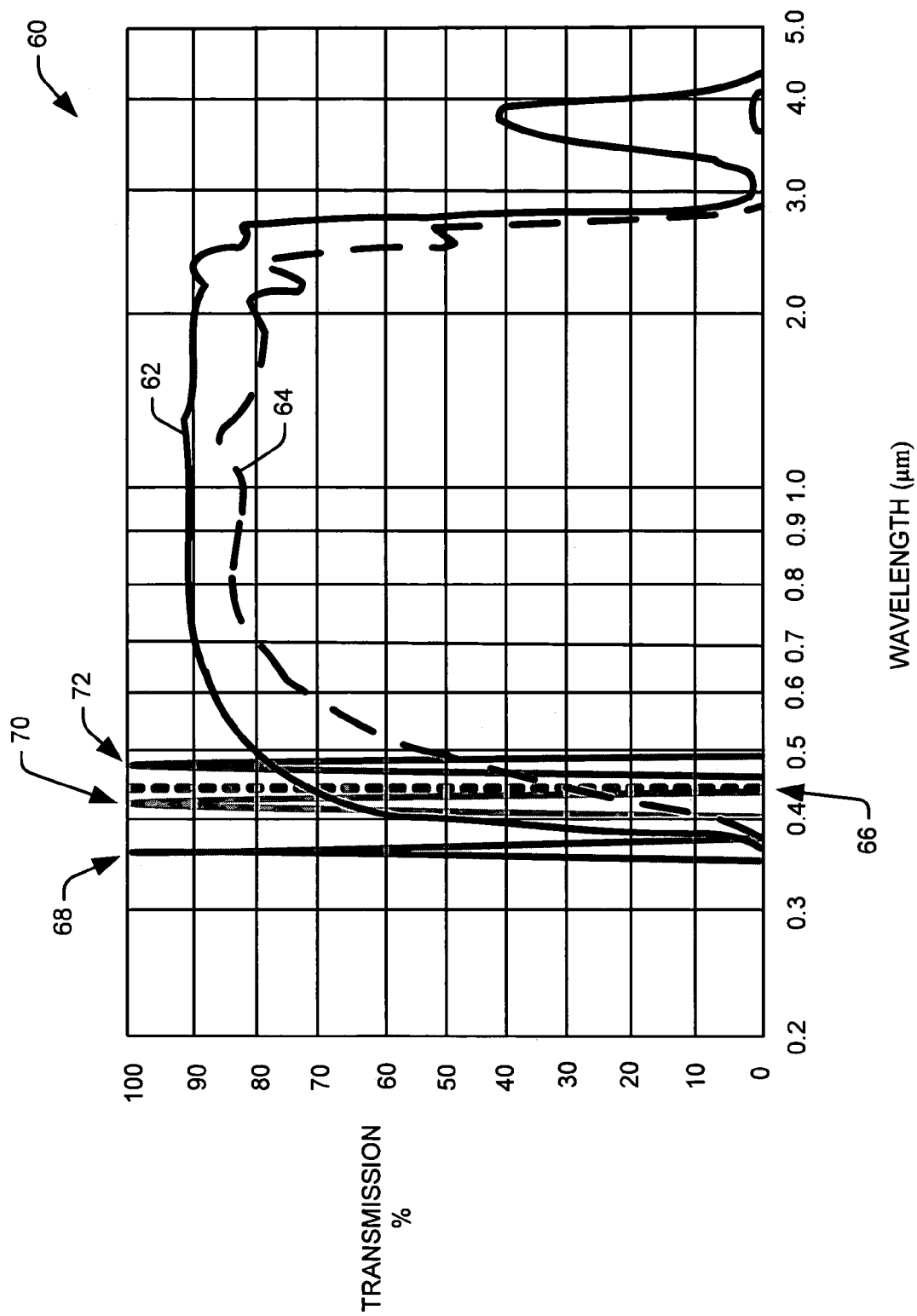
FIG. 3 illustrates a graph of transmission percentage of a frame material versus light source wavelength.

FIG. 3 illustrates a graph 60 of transmission percentage (%) versus wavelength (μm) of ZERODUR glass. The graph 60 illustrates a first transmission window 62 for ZERODUR glass having a thickness of 5 mm and a second transmission window 64 for ZERODUR glass having a thickness of 25 mm. As illustrated in the graph 60, the ZERODUR glass has a strong cutoff wavelength of 380 nm or shorter. Additionally, the oxidized aluminum coating of the cathode requires a threshold wavelength 66 of 443 nm or less. Also further illustrated in the graph is a light wavelength 68 of a 370 nm UV LED, a light wavelength 70 of a 430 nm blue LED, and a light wavelength 72 of a 470 nm blue LED. As can be seen from the graph 60, the 430 nm blue LED is a selection that provides both the required threshold wavelength for a laser gyroscope having oxidized aluminum with a work function of about 2.8 ev and is also above the cutoff wavelength of the ZERODUR glass at a thickness of 5 mm. It is to be appreciated that other LED devices within the desired wavelength range could be employed. Additionally, it is to be appreciated that a LED with a different wavelength may be selected for cathode material coatings with different work functions and other types of frame material and/or frame material thickness.

Referring again to FIG. 1, the exemplary solid state light device of FIG. 1 is provided by providing a LED assembly 30 having a first LED 32 and a second LED 34. The first LED 32 and second LED 34 provide overlapping illumination 38 and 40 to the cathode 28. The second LED 34 is electrically coupled in parallel to the first LED 32 and provides functional redundancy in the event that one of the first and second LEDs 32 and 34 fail during operation of the laser gyroscope 10.

The laser gyroscope 10 also includes a heterodyne photodetector assembly 42 disposed behind the mirror 14. The mirror 14 is partially transmissive to allow part of the light beams 19 and 21 to exit the cavity 22 for processing to determine the rotation rate by the photodetector assembly 42. The photodetector assembly 42 determines the differences in frequency between the two counterpropagating light beams. The beam that is traveling in the direction of rotation of the platform has a longer distance to travel and thus a lower frequency. Conversely, the beam traveling against the direction of motion has a shorter path and a higher frequency. The difference in frequency is directly proportional to the rotation rate. The photodetector assembly 42 can also be used to determine when the gas medium has ionized.

Figure 2:
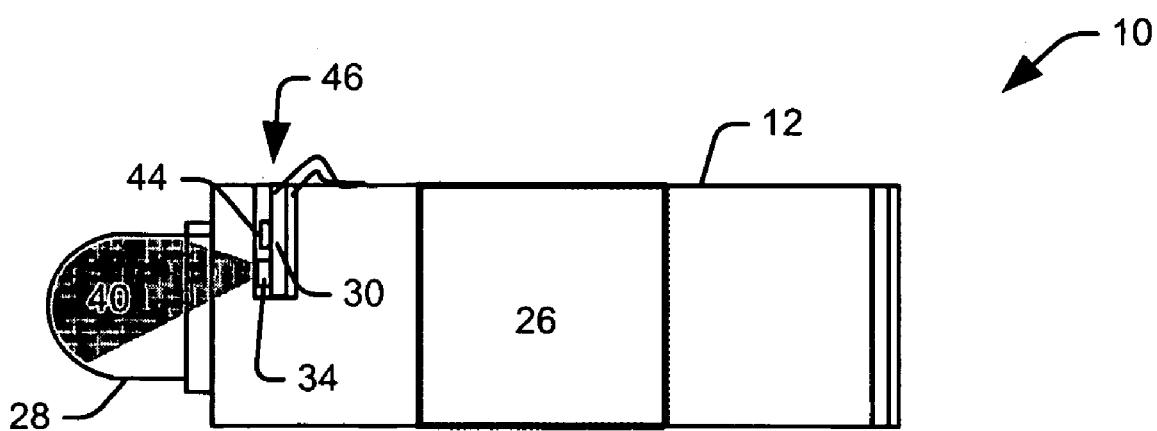
FIG. 2 illustrates side view of the ring laser gyroscope of FIG. 1.

FIG. 2 illustrates a side view of the laser gyroscope 10 of FIG. 1. As illustrated in FIG. 2, the LED assembly 30 is disposed in a recess 46 of the frame 12. The recess 46 is adjacent the cathode 28 of the laser gyroscope 10. In FIG. 2, the LED 34 is illustrated as being coupled to a surface mount resistor 44 (e.g., ≅60 ohms) to form a first resistor LED network. A control signal turns the LED 34 to an on state to provide light having a wavelength that is at or below the threshold level of the work function of the cathode material to produce the desired photoelectric effect, but above the cutoff wavelength of the frame material. The LED 34 remains in an on state for a start up period, while a start voltage is applied between the anodes 24 and 26 and the cathode 28. Once the gas medium in the laser gyroscope 12 is ionized, the LED 34 can be turned off. Alternatively, the LED 34 can remain on, but does not serve any further function once the gas medium has been ionized. It is to be appreciated that the LED 32 would perform in the same manner as the LED 34 and be coupled in series with a similar resistor to form a second resistor LED network. The first resistor LED network can be coupled in parallel with the second resistor LED network.

Figure 4:
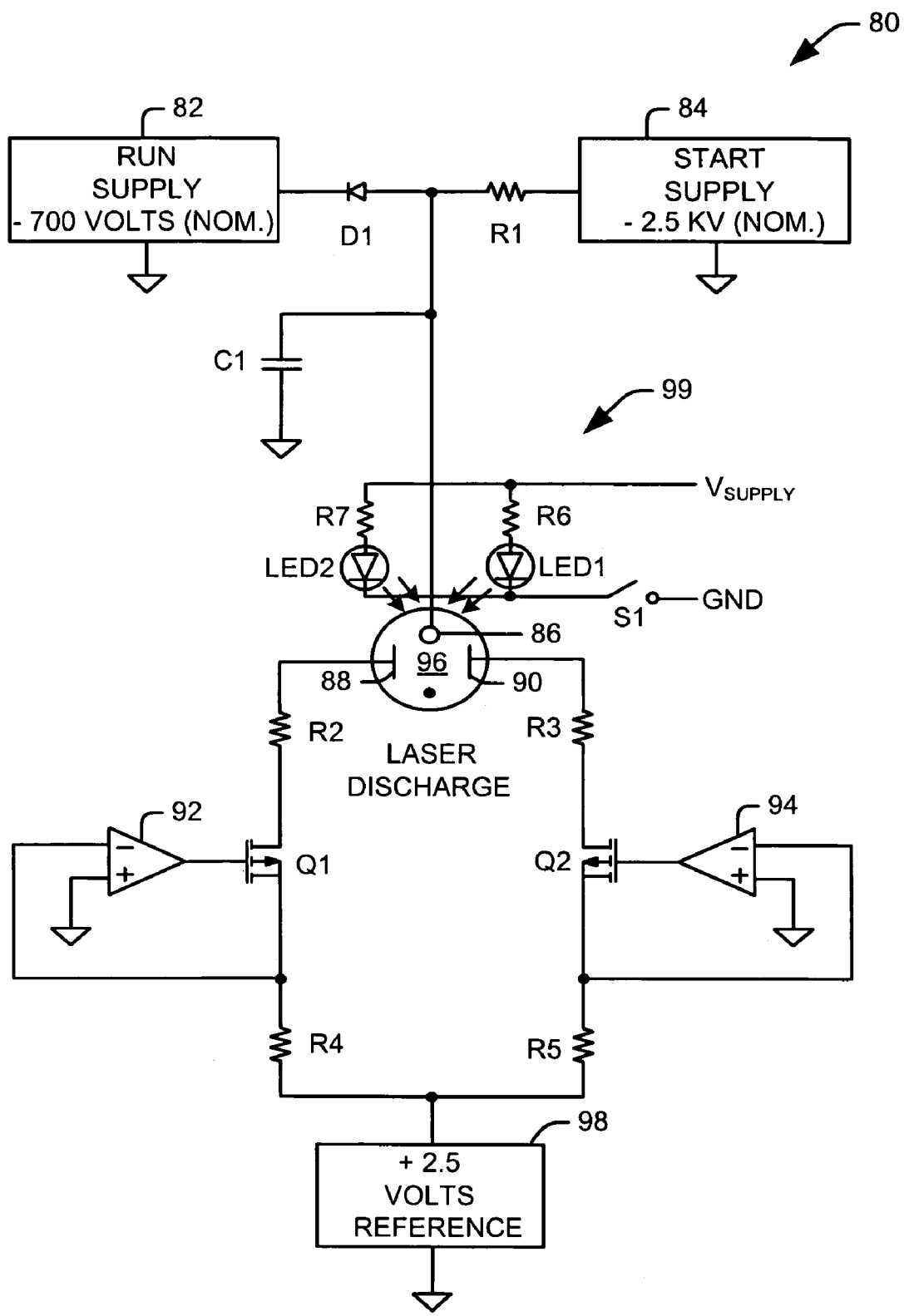
FIG. 4 illustrates a start up circuit for a laser gyroscope in accordance with an aspect of the present invention.

FIG. 4 illustrates a start up circuit 80 for a laser gyroscope in accordance with an aspect of the present invention. The startup circuit 80 includes a start supply 84 coupled to a cathode 86 through a resistor R1 (e.g., 50 Mohms) having a relatively large resistance and a run supply voltage 82 coupled to the cathode 86 through a diode D1. An anode of the diode D1 is coupled to the cathode 86 and a cathode of the diode D1 is coupled to the run supply voltage 82. A capacitor C1 (e.g., 680 pf) is also coupled to the cathode, which facilitates concurrent starting of both discharge paths. A first anode 88 is coupled to a reference voltage 98 (e.g., 2.5 volts) through a resistor R2 (e.g., 150 Kohms), a transistor Q1 (e.g., a p-type enhancement type MOSFET) and a precision resistor R4 (e.g., 3.32 Kohms). The transistor Q1 has its drain fed back to a negative terminal of an operational amplifier 92 with a positive terminal of the operational amplifier 92 being coupled to ground. The output of the operational amplifier 92 is coupled to a gate of the transistor Q1. The operational amplifier 92, the transistor Q1 and the precision resistor R4 operate to regulate the current between the first anode 88 and the reference voltage 98 during operation of the laser gyroscope.

A second anode 90 is coupled to the reference voltage 98 through a resistor R3 (e.g., 150 Kohms), a transistor Q2 (e.g., a p-type enhancement type MOSFET) and a precision resistor R5 (e.g., 3.32 Kohms). The transistor Q2 has its drain fed back to a negative terminal of an operational amplifier 94 with a positive terminal of the operational amplifier 94 being coupled to ground. The output of the operational amplifier 94 is coupled to a gate of the transistor Q2. The operational amplifier 94, the transistor Q2 and the precision resistor R5 operate to regulate the current between the second anode 90 and the reference voltage 98 during operation of the laser gyroscope.

A start aid circuit 99 is provided that includes a first LED (LED1) and a second LED (LED2) disposed adjacent the cathode 86. The first and second LEDs provide illumination onto the cathode 86 to facilitate ionization of a gas medium disposed in a cavity 96 of the laser gyroscope during startup. The first and second LEDs provide light at a wavelength that is at or below a threshold wavelength based on a work function of the cathode coating material and at a wavelength that is above a cutoff wavelength of the material of the frame of the laser gyroscope. The first LED has its anode coupled to a supply voltage ($V_{SUPPLY}$) through a resistor R6 and the second LED has its anode coupled to the supply voltage ($V_{SUPPLY}$) through a resistor R7. The cathodes of both the first LED and the second LED are coupled to ground through a switch S1. The closing of the switch S1 turns both the first LED and the second LED on, while the opening of the switch S1 turns both the first and second LED off.

During a startup time period, the first and second LED are turned on by closing switch S1, while a high voltage via the start supply 84 and the reference voltage 98 is applied between anodes 88 and 90 and the cathode 86. The startup time period can be based on a predetermined time period, or by the detection of counterpropagating beams that are a result of ionization of the gas medium. The plasma current discharge takes place between the cathode 86 which is operated at about −700 volts and the two anodes 88 and 90 which reside at about −200 volts during startup. The total current of the plasma discharge is maintained at a fixed value around 1.5 milliamps due to current limiting of the operational amplifiers 92 and 94, transistors Q1 and Q2 and precision resistors R4 and R5. When power is applied, the discharge path is an open circuit until the voltage rises high enough to encourage a breakdown of the gas. The cathode 86 is free to rise to the higher voltage but typically a discharge is established before that occurs. The large resistance of R1 in series with the higher voltage of the start supply 84 isolates the start supply 84 after the plasma forms leaving −700 volts from the run supply 82 on the cathode 86. After the gas medium ionizes, the first and second LEDs can be turned off by opening switch S1, but may remain on during normal operation.

Figure 5:
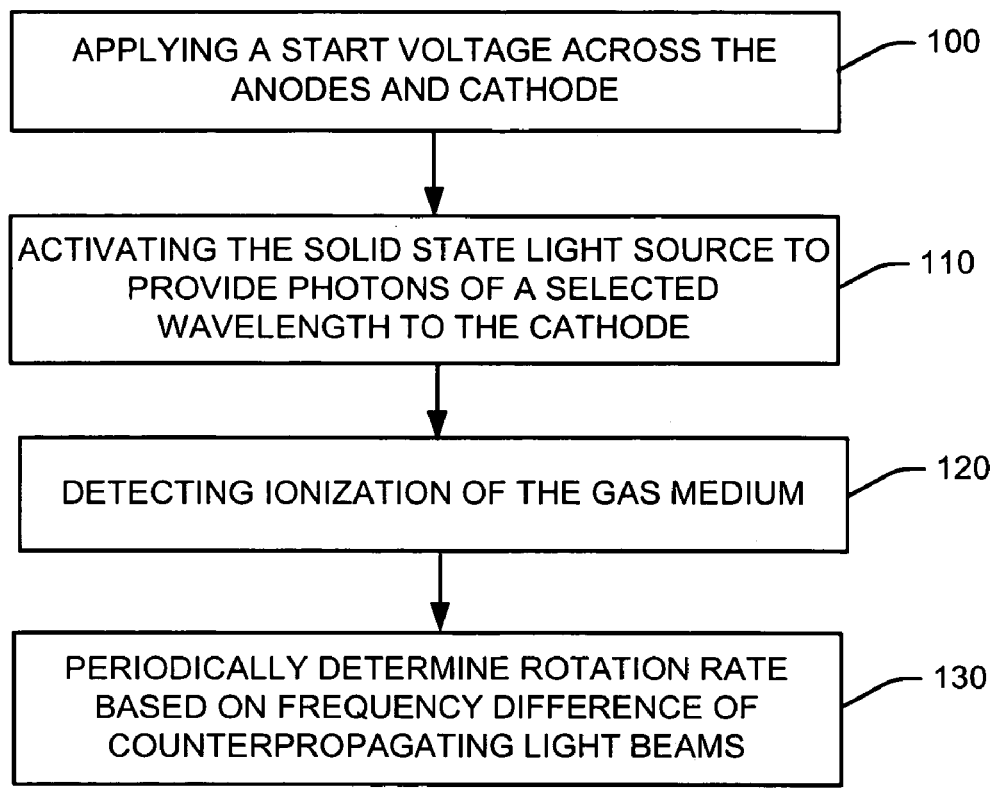
FIG. 5 illustrates a methodology of a laser gyroscope operation in accordance with an aspect of the present invention.
Figure 6:
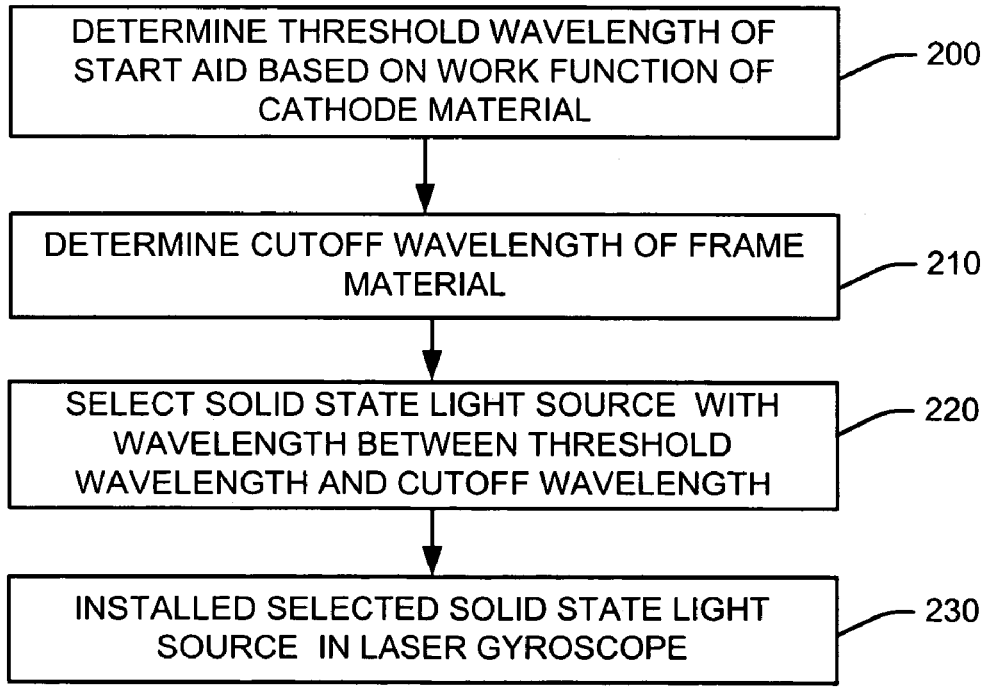
FIG. 6 illustrates a methodology for providing a start aid for a laser gyroscope in accordance with an aspect of the present invention.

In view of the foregoing structural and functional features described above, methodologies in accordance with various aspects of the present invention will be better appreciated with reference to FIGS. 5-6. While, for purposes of simplicity of explanation, the methodologies of FIGS. 5-6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates a methodology of a laser gyroscope operation in accordance with an aspect of the present invention. At 100, a start voltage (e.g., about 2500 volts) is applied across the anodes and the cathode of the laser gyroscope. The start voltage is typically substantially higher than the operating voltage when employing a light source of an appropriate wavelength as a start aid. The methodology then proceeds to 110. At 110, a solid state light source is activated to provide photons of a selected wavelength to a cathode of the laser gyroscope. The wavelength of the solid state light source can be selected based on determining the work function of the cathode coating material and evaluating Eq. 1 to determine the threshold wavelength required to produce the desired photoelectric effect and initiate ionization of the gas medium in the laser gyroscope. For example, an LED can be selected that provides light in the blue to violet part of the visible spectrum (e.g., about 390 nm to about 490 nm) for a cathode coated with oxidized aluminum having a work function within the range of about 2.53 ev to about 3.18 ev. The methodology then proceeds to 120.

At 120, ionization of the gas medium is detected. Ionization of the gas medium can be detected by determining if light beams are present by the photodetector of the laser gyroscope. Alternatively, it can be assumed after a predetermined time period (e.g., two seconds) that the gas has sufficiently ionized to produced the desired light beams. Once the gas ionizes, the start voltage drops to an operating voltage (e.g., about 700 Volts) due to current conducting as a result of the plasma discharge. At this point the gas has ionized and the plasma discharge has generated the desired counterpropagating light beams. The solid state light source can then be deactivated. Alternatively, the solid state light source can remain activated, but has no additional effect on the ionization. The methodology then proceeds to 130 where the rotation rate of the laser gyroscope is periodically determined based on the frequency difference of the counterpropagating light beams.

FIG. 6 illustrates a methodology for providing a start aid for a ring laser gyroscope in accordance with an aspect of the present invention. At 200, a threshold wavelength of the start aid is determined based on a work function of a cathode coating material of the ring laser gyroscope. The threshold wavelength can be determined based on the evaluation of Eq. 1. The wavelength of the start aid can be at or below the threshold wavelength of the work function to create the desired photoelectric effect. At 210, a cutoff wavelength of the frame material is determined. The methodology then proceeds to 220. At 220, a solid state light source (e.g., a LED) is selected that provides a wavelength that is between the determined start aid threshold wavelength associated with the work function of the cathode coating material and the cutoff wavelength of the frame material. At 230, the selected solid state light source is installed in the laser gyroscope.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A ring laser gyroscope comprising:
   a frame having a cavity that forms a path defined by a plurality of mirrors;
   a gain medium positioned in the cavity that produces counterpropagating light beams when electrically excited;
   a cathode and two anodes connected to the cavity and forming two gain regions of the cavity for plasma discharge in opposing directions of the gain regions; and
   a solid state light emitting device that illuminates the cathode during at least a startup period of the laser gyroscope to facilitate ionization of the gas medium, the solid state light emitting device generating light at a wavelength that is at or below a threshold wavelength based on a work function of the coating material of the cathode.

2. The laser gyroscope of claim 1, wherein the solid state light emitting device is a light emitting diode (LED) that produces light at a wavelength that is in the blue to violet range of the visible spectrum.

3. The laser gyroscope of claim 2, wherein the LED produces light at a wavelength within the range of about 390 nm to about 490 nm.

4. The laser gyroscope of claim 1, wherein the coating material of the cathode is oxidized aluminum having a work function of about 2.53 ev to about 3.18 ev.

5. The laser gyroscope of claim 4, wherein the solid state light emitting device is a blue light emitting diode (LED) that produces light at a wavelength of about 430 nm.

6. The laser gyroscope of claim 1, further comprising a power supply that provides a startup voltage across the anodes and cathode during a startup period and a power supply that provides an operating voltage that is less than the startup voltage once the gas medium has ionized.

7. The laser gyroscope of claim 6, wherein the startup period is based on one of expiration of a predetermined time period and detection of ionization of the gas medium.

8. The laser gyroscope of claim 1, wherein the solid state light emitting device comprises a first light emitting diode (LED) and a second LED coupled in parallel with the first LED, the second LED providing redundancy for the first LED.

9. The laser gyroscope of claim 1, further comprising a photodetector for detecting the counterpropagating light beams, wherein the photodetector outputs are signals indicative of an end to a startup period by detecting laser radiation of the gas medium.

10. The laser gyroscope of claim 1, wherein the solid state light emitting device is disposed in a recess of the frame.

11. The laser gyroscope of claim 1, wherein the solid state light emitting device generates light at a wavelength that is above a cutoff wavelength associated with a frame material and frame material thickness.

12. A method for facilitating ionization of a gas medium positioned in a cavity of a frame of a ring laser gyroscope having a cathode and two anodes connected to the cavity and forming two gain regions of the cavity for plasma discharge in opposing directions of the gain regions, the method comprising;
   applying a start voltage across the anodes and cathode;
   illuminating the cathode with a solid state light source that generates light at a wavelength that is at or below a threshold wavelength based on a work function of a coating material of the cathode;

determining if laser radiation from the gas medium has begun indicating that the gas medium has ionized; and determining the rotation rate of the laser gyroscope.

13. The method of claim 12, wherein the solid state light emitting device is a light emitting diode (LED) that produces light at a wavelength that is in the blue to violet range of the visible spectrum.

14. The method of claim 13, wherein the coating material of the cathode is oxidized aluminum having a work function of about 2.8 ev and the LED is a blue light emitting diode (LED) that produces light at a wavelength of about 430 nm.

15. The method of claim 12, wherein the startup voltage is about 1000 to about 3000 volts, which reduces to an operating voltage of about 600 to about 800 volts.

16. The method of claim 12, wherein the determining if the gas medium has begun to ionize is comprised of one of determining if a startup time period has expired and determining if counterpropagating light beams have been detected.

17. The method of claim 12, wherein the solid state light emitting device generates light at a wavelength that is above a cutoff wavelength associates with a frame material and frame material thickness.

18. A method for providing a start aid for a ring laser gyroscope, the method comprising;

determining a start aid threshold wavelength based on a work function of a coating material of a cathode of the ring laser gyroscope;

determining a cutoff wavelength associated with a frame material and a frame material thickness of the ring laser gyroscope; and selecting a light emitting diode (LED) that has a wavelength between the start aid threshold wavelength and the cutoff wavelength as a start aid.

19. The method of claim 18, further comprising installing the selected LED in the laser gyroscope for providing illumination to the cathode during a startup period of the ring laser gyroscope.

20. The method of claim 18, wherein the selecting the LED comprises selecting an LED that has a wavelength that is in the blue to violet range of the visible spectrum.

* * * * *